(12) United States Patent
Singh

(10) Patent No.: US 8,868,806 B2
(45) Date of Patent: *Oct. 21, 2014

(54) METHODS AND STRUCTURE FOR HARDWARE MANAGEMENT OF SERIAL ADVANCED TECHNOLOGY ATTACHMENT (SATA) DMA NON-ZERO OFFSETS IN A SERIAL ATTACHED SCSI (SAS) EXPANDER

(71) Applicant: LSI Corporation, San Jose, CA (US)

(72) Inventor: Gurvinder Pal Singh, Dasuya (IN)

(73) Assignee: LSI Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/050,997

(22) Filed: Oct. 10, 2013

(65) Prior Publication Data

US 2014/0047134 A1 Feb. 13, 2014

Related U.S. Application Data

(63) Continuation of application No. 13/568,871, filed on Aug. 7, 2012, now Pat. No. 8,589,607.

(51) Int. Cl.
*G06F 13/10* (2006.01)
*G06F 3/06* (2006.01)

(52) U.S. Cl.
CPC ............ *G06F 3/0619* (2013.01); *G06F 3/0661* (2013.01); *G06F 13/10* (2013.01); *G06F 3/0673* (2013.01)
USPC ................................................ 710/74; 710/14

(58) Field of Classification Search
CPC combination set(s) only.
See application file for complete search history.

(56) References Cited

U.S. PATENT DOCUMENTS

| | | | |
|---|---|---|---|
| 7,404,013 B1 | 7/2008 | Masiewicz | |
| 7,738,366 B2 | 6/2010 | Uddenberg et al. | |
| 7,739,432 B1* | 6/2010 | Shaw et al. | 710/74 |
| 2005/0235072 A1* | 10/2005 | Smith et al. | 710/22 |
| 2006/0041702 A1* | 2/2006 | Greenberger | 710/306 |
| 2007/0011360 A1* | 1/2007 | Chang et al. | 710/5 |
| 2007/0088974 A1 | 4/2007 | Chandwani et al. | |
| 2007/0237174 A1* | 10/2007 | Chang et al. | 370/467 |
| 2008/0086576 A1 | 4/2008 | Schauer | |
| 2008/0162773 A1 | 7/2008 | Clegg et al. | |
| 2012/0054404 A1 | 3/2012 | Day | |
| 2012/0144082 A1 | 6/2012 | Romero et al. | |

* cited by examiner

*Primary Examiner* — Ilwoo Park
(74) *Attorney, Agent, or Firm* — Duft Bornsen & Fettig

(57) ABSTRACT

Methods and structure for enhanced SAS expander functionality to store and forward buffered information transmitted from a SATA end device to an STP initiator device while managing use of Non-Zero Offset ("NZO") field values in DMA Setup FISs transmitted by the SATA end device. The enhanced expander establishes a connection between an STP initiator and a SATA end device. The expander forwards a read command from the initiator to the end device. If NZO use is supported and enabled in the end device, the end device may return read data in any order by use of the NZO field values in multiple DMA Setup FISs. The expander is further adapted to store received data and the associated multiple DMA Setup FISs from the end device in its buffer and forwards the stored data to the initiator device. In another embodiment, use of NZO in the end device is disabled.

20 Claims, 5 Drawing Sheets

METHODS AND STRUCTURE FOR HARDWARE MANAGEMENT OF SERIAL ADVANCED TECHNOLOGY ATTACHMENT (SATA) DMA NON-ZERO OFFSETS IN A SERIAL ATTACHED SCSI (SAS) EXPANDER

CROSS REFERENCE TO RELATED APPLICATIONS

This continuation application claims priority to U.S. patent application Ser. No. 13/568,871, filed on Aug. 7, 2012, and titled "METHODS AND STRUCTURE FOR HARDWARE MANAGEMENT OF SERIAL ADVANCED TECHNOLOGY ATTACHMENT (SATA) DMA NON-ZERO OFFSETS IN A SERIAL ATTACHED SCSI (SAS) EXPANDER," which is hereby incorporated by reference.

BACKGROUND

1. Field of the Invention

The invention relates generally to error recovery in a serial protocol and more specifically relates to a customized circuit within a SAS expander to process use of DMA Non-Zero Offsets in data received from a SATA end device.

1. Related Patents

This patent is related to commonly owned U.S. patent application Ser. No. 13/557,437 entitled METHODS AND STRUCTURE FOR HARDWARE SERIAL ADVANCED TECHNOLOGY ATTACHMENT (SATA) ERROR RECOVERY IN A SERIAL ATTACHED SCSI (SAS) EXPANDER which is hereby incorporated by reference and is herein referred to as the "Related Patent".

3. Discussion of Related Art

High speed serial communication systems have grown in popularity due to reduced cabling costs and the increased usable length enabled by a smaller cable with differential signaling. In particular, storage system end devices often utilize SAS and/or SATA high speed serial communication media and protocols to provide reduced cost, improved cabling lengths, and high performance.

In some embodiments, a SAS switched fabric (SAS Service Delivery Subsystem) allows coupling of SATA storage devices to the SAS domain to provide lower cost alternatives for high performance storage devices (e.g., SATA disk drives). In such environments, the SATA Tunneling Protocol (STP) of the SAS specifications is used to allow an STP initiator to open a connection through the SAS switched fabric to a SATA storage device. The switched fabric comprises one or more SAS expanders providing switchable point to point connections between an initiator device (e.g., an STP initiator such as a host system storage controller) and a target device (e.g., a SATA storage device).

In general, once a connection is established between an initiator and a target, the switched fabric becomes, essentially, a passive conduit for passing information between the two end devices (i.e., between the connected initiator and target devices). Some SAS expanders have been enhanced to provide more intelligence than a mere "passive conduit". For example, the SAS expander discussed in the Related Patent is adapted to detect and process SATA errors in communications between an STP initiator device and a SATA end device while buffering communications there between using a speed matching buffer within the expander. For example, some recent expanders from LSI Corporation include a feature named "End Device Frame Buffering" (EDFB or more simply "Store and Forward" or "SNF") to provide, among other features, speed matching buffering. When the EDFB features are in use, data returned from a SATA end device (i.e., in response to a read request from the initiator) could be returned to the expander and stored in the speed matching buffer in other than sequential order (i.e., where the SATA end device uses Non-Zero Offset values in DMA Setup Frame Information Structures associated with the return of data). Yet, data and associated protocol frames relating to the data must be returned to the STP initiator in proper sequence. For example, a frame indicating end of transmission from an end device should not be forwarded to the initiator device before all data has been forwarded from the end device to the initiator device through the speed matching buffer.

Thus, it is a problem for a SAS expander having such speed matching buffering features (e.g., LSI's EDFB features) to assure proper handling of data returned from a SATA end device in other than sequential order (i.e., using Non-Zero Offsets) to assure proper sequencing with other protocol frames and transmissions.

SUMMARY

The present invention solves the above and other problems, thereby advancing the state of the useful arts, by providing methods and structure for enhanced SAS expander functionality to store and forward buffered information transmitted from SATA end device to an STP initiator device while managing use by the end device of Non-Zero Offset ("NZO") field values in DMA Setup Frame Information Structures (FISs) from the end device. The enhanced expander determines whether the end device supports use of NZO field values and, if so, selectively enables or disables use of NZO field values by the end device. If enabled, the expander is further adapted to receive read data from the end device (responsive to a read command) and is further adapted to store the read data in a buffer and to forward the stored read data to the STP initiator device. Where use of NZO field values by the end device is enabled, the data may be received in any order using multiple data frames and multiple DMA Setup frames. Further, where use of NZO field values is enabled, the enhanced expander is further adapted to delay forwarding of completion status received from the end device to the initiator device until all received data is stored and forwarded. In another exemplary embodiment, the enhanced expander manages use of NZO field values by disabling use of NZO field values by the end device so as to assure that protocol frames stored and forwarded from the end device to the initiator device remain in proper sequence (i.e., a single DMA Setup FIS followed by the data frame and the completion status frame).

In one aspect hereof, a SAS expander is provided comprising a host physical link (PHY) adapted to couple with an STP initiator device and a target PHY adapted to directly couple with a SATA end device. The expander further comprises a buffer coupled with the host PHY and coupled with the target PHY to store commands received from the STP initiator device to be forwarded to the SATA end device and to store data to be exchanged between the STP initiator device and the SATA end device. The expander also comprises a programmable controller adapted to establish a connection between the host PHY and the target PHY to permit the transfer of commands from the STP initiator device to the SATA end device through the buffer and to permit the exchange of data between the STP initiator device and the SATA end device through the buffer. The expander further comprises a control circuit coupled with the host PHY and coupled with the target PHY. The control circuit is adapted to store in the buffer commands received from the STP initiator device and is adapted to store in the buffer data received from the SATA end device over the established connection. The control circuit is further adapted to forward stored data from the buffer to the STP initiator device. The control circuit is further adapted to store and forward commands and data without involvement of the programmable controller. The programmable controller is further adapted to selectively enable use of Non-Zero Offset fields by the SATA end device when the SATA end device supports use of Non-Zero Offset fields in DMA Setup Device to Host (D2H) Frame Information Structures (FISs) in processing of data stored in the buffer to be forwarded by the control circuit to the STP initiator. The control circuit is further adapted to receive multiple data FISs from the SATA end device in response to a command in any order when use of Non-Zero Offset fields by the SATA end device is enabled. The control circuit is further adapted to receive a Set Device Bits (SDB) FIS from the SATA end device indicative of the end of data transmission from the SATA end device, and, responsive to receipt of the SDB FIS, is further adapted to delay forwarding the SBD FIS to the STP initiator device until all data received from the SATA end device responsive to a command is transmitted from the buffer to the STP initiator device.

Another aspect hereof provides a method operable in a SAS expander. The method manages use of Non-Zero Offset fields in exchanges between devices coupled with the expander. The method comprises establishing, by operation of a programmable controller of the expander, a connection between an STP initiator device coupled through a host physical link (PHY) of the expander and a SATA target device coupled through a target PHY of the expander. The established connection uses a control circuit of the expander and a buffer memory of the expander to store and forward commands and data to be exchanged between the STP initiator device and the SATA end device. The control circuit is distinct circuitry from the programmable controller and operable in parallel with the programmable controller. The method further comprises enabling, by operation of the programmable controller, use of Non-Zero Offset fields by the SATA end device when the SATA end device supports use of Non-Zero Offset fields in DMA Setup Device to Host (D2H) Frame Information Structures (FISs) when transmitting data to the control circuit for storage in the buffer for eventual forwarding to the STP initiator. The method then receives at the control circuit data transmitted from the SATA end device wherein the data comprises multiple data FISs in any order and comprises one or more DMA Setup D2H FISs having Non-Zero Offset field values. The method then stores in the buffer, by operation of the control circuit, data derived from the multiple data FISs. The method then forwards, by operation of the control circuit, the received data from the buffer to the STP initiator device. The method further comprises receiving, by operation of the control circuit, a Set Device Bits (SDB) FIS from the SATA end device indicative of the end of data transmission from the SATA end device in response to a command. The method also comprises delaying, by operation of the control circuit, forwarding of the received SDB FIS to the STP initiator device until all data received from the SATA end device in response to a command is transmitted from the buffer to the STP initiator device.

Still another aspect hereof provides a method operable in a SAS expander adapted to couple with an STP initiator device and further adapted to directly couple with a SATA end device. The method manages use of Non-Zero Offset fields in exchanges between the SATA end device and the STP initiator device. The method comprises establishing a connection through the expander between the STP initiator device and the SATA end device. The connection is established by a programmable controller of the expander. The method further comprises disabling, by operation of the programmable controller, use of Non-Zero Offset field values in data transferred from the SATA end device and receiving a read command from the STP initiator device directed to the SATA end device. The command is received in a control circuit of the expander distinct from the programmable controller of the expander and wherein the received command is forwarded to the SATA end device by the control circuit. The method then receives in the control circuit data from the SATA end device responsive to the read command and stores, by operation of the control circuit, the data in a buffer within the expander and associated with the control circuit. The method then forwards, by operation of the control circuit, the data from the buffer to the STP initiator device in an order in which it was received from the SATA end device.

DETAILED DESCRIPTION OF THE DRAWINGS

Figure 1:
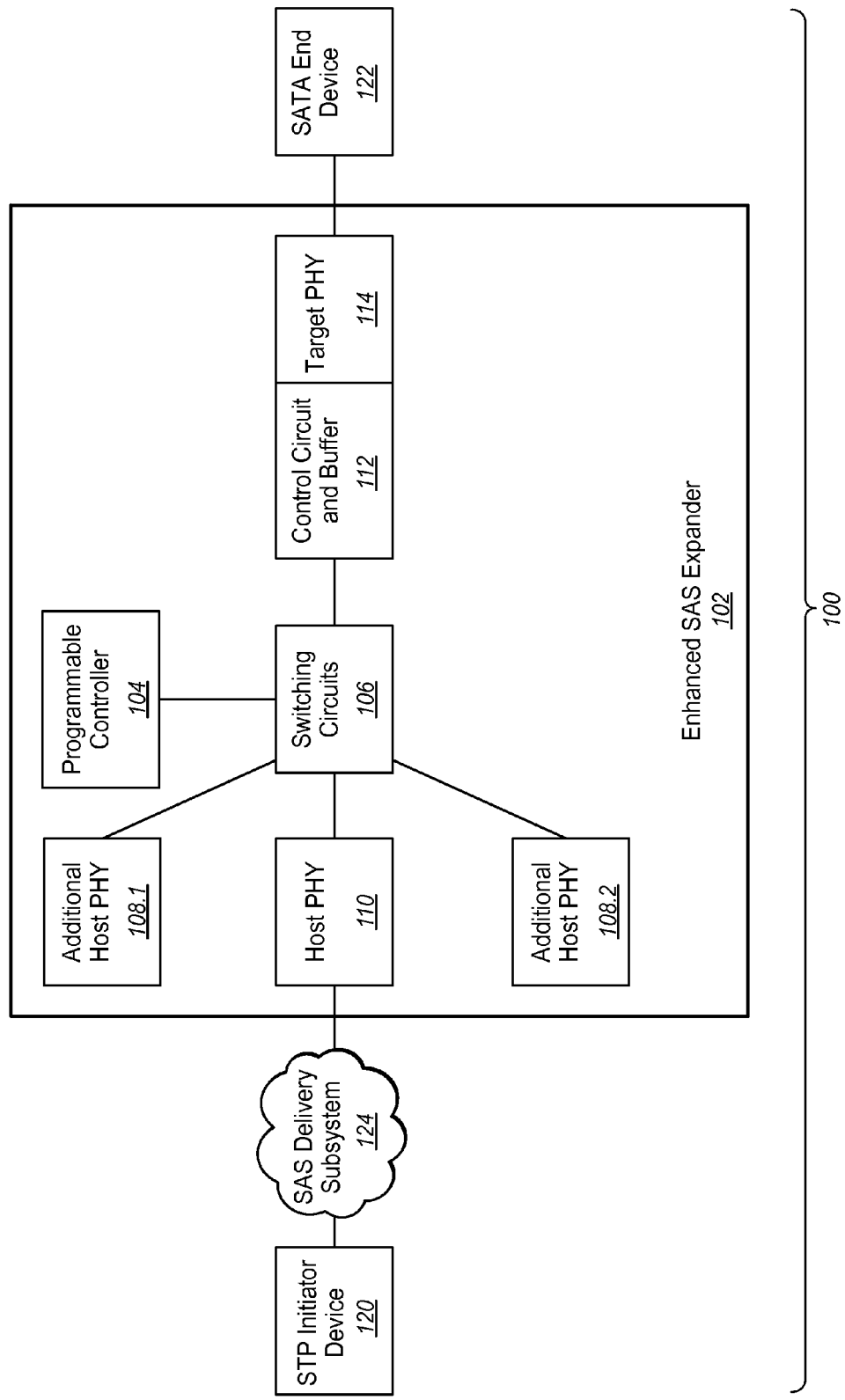
FIG. 1 is a block diagram of an exemplary system including a SAS expander enhanced in accordance with features and aspects hereof to provide buffering of commands and management of Non-Zero Offset field values in the return of data from a SATA end device to an STP initiator device.

FIG. 1 is a block diagram of an exemplary system 100 enhanced in accordance with features and aspects thereof to provide for use of Non-Zero Offsets within a SAS expander in data transfers from a SATA end device directly coupled with the expander. System 100 comprises STP initiator device 120 coupled with SATA end device 122 through SAS delivery subsystem 124 (e.g., "SAS fabric" or "SAS switched fabric") comprising at least enhanced SAS expander 102. Any number of intermediate expanders may be provided as a matter of design choice between STP initiator device 120 and expander 102. STP initiator device 120 may comprise any suitable device, component, or system that serves in the role of an initiator device utilizing STP when coupled to SAS delivery subsystem 124. For example, STP initiator device 120 may be a computer system such as a workstation or server having a suitable STP initiator controller device integrated therein. In some exemplary embodiments, STP initiator device 120 may be a storage controller such as a storage controller host bus adapter ("HBA") within a computing system or a storage controller integrated within a larger storage subsystem. SATA end device 122 may be any suitable end device (i.e., target device), component, or system compliant with the SATA protocols to permit coupling with a SATA host and/or with an STP initiator device in the context of a SAS domain. In some exemplary embodiments, SATA end device 122 may be a storage device such as a single disk drive, a solid state drive, or an entire storage subsystem.

Enhanced SAS expander 102 provides standard switching capabilities as provided by any SAS expander for selectively coupling any of its multiple physical links ("PHYs") to any other of its multiple PHYs. As noted above, in general, expander 102 may be considered part of SAS delivery subsystem 124. Specifically, SAS expander 102 is the expander of the SAS fabric that is directly coupled with SATA end device 122 (e.g., as distinct from any other intermediate SAS expanders that may be part of the larger SAS delivery subsystem 124). In accordance with standard SAS expander functionality, expander 102 includes multiple PHYs such as host PHY 110, target PHY 114, and additional host PHYs 108.1 and 108.2.

Those of ordinary skill will recognize that any number of such PHYs may be present in expander 102 as appropriate for a particular application. Further, a PHY is designated herein as a "host" or "target" PHY simply to clarify the type of devices to which each PHY is coupled in the exemplary system of FIG. 1. Each PHY of expander 102 may be designed with equivalent features and may thus be used for any desired connection as appropriate to the particular SAS application. Thus, host PHY 110 and additional host PHYs 108.1 and 108.2 are shown as exemplary PHYs coupling SAS expander 102 with host devices such as STP initiator device 120. Such host devices may be directly coupled with a corresponding PHY of expander 102 or may be indirectly coupled as shown for PHY 110 through other components of a SAS delivery subsystem 124. Target PHY 114 represents a PHY of expander 102 that is directly coupled with a SATA end device 122.

In accordance with standard SAS expander architectures, expander 102 further comprises programmable controller 104 and associated switching circuit 106. Programmable controller 104 detects a request received over any PHY (e.g., host PHY 108.1, 108.2, and 110) to establish a connection with another PHY (e.g., target PHY 114). Responsive to such a request, programmable controller 104 configures switching circuit 106 to establish a temporary, switched, communications path (a "connection") between the PHY requesting such a connection and the identified target PHY. As is generally known in the art, programmable controller 104 is typically implemented as a suitably programmed general or special purpose processor with associated program and data memory. In some embodiments, programmable controller 104 may further comprise one or more application-specific integrated circuits to assist in the establishment of a requested connection between two PHY of the expander. Switching circuit 106 generally comprises multiplexer logic or other switching device circuitry programmable by operation of programmable controller 104 to electronically couple two PHYs within expander 102. Switching circuit 106 is often referred to as a "crossbar switch" but may be implemented in a variety of well-known circuit designs.

In accordance with features and aspects hereof, expander 102 is enhanced to further comprise control circuit and buffer 112. Control circuit and buffer 112 comprises circuits associated with target PHY 114 to provide performance enhancements in the processing of SATA protocol exchanges between STP initiator device 120 and SATA in device 122. In some exemplary embodiments, each PHY of expander 102 may include control circuit and buffer 112 to permit each PHY to be enabled for use of these enhanced features when that PHY is directly coupled to an end device (e.g., a SATA end device or a SAS end device).

As noted above, control circuit and buffer 112 may include, among other functions, a speed matching buffer feature that allows expander 102 to communicate with high-performance STP initiator devices such as STP initiator device 120 using a first communication speed while communicating with a SATA end device such as end device 122 utilizing a second, slower communication speed. Control circuit and buffer 112 also provides for use of Non-Zero Offset field values in data transfers from an end device to an initiator through the speed matching buffer—i.e., store and forward of frames responsive to a read request while assuring proper sequencing frames as forwarded to the STP initiator device. Thus, use of Non-Zero Offset fields in data received from the SATA end device 122 allows the end device to perform optimal data retrieval while the control logic of circuit 112 assures proper sequencing of frames returned to STP initiator device 120.

Figure 2:
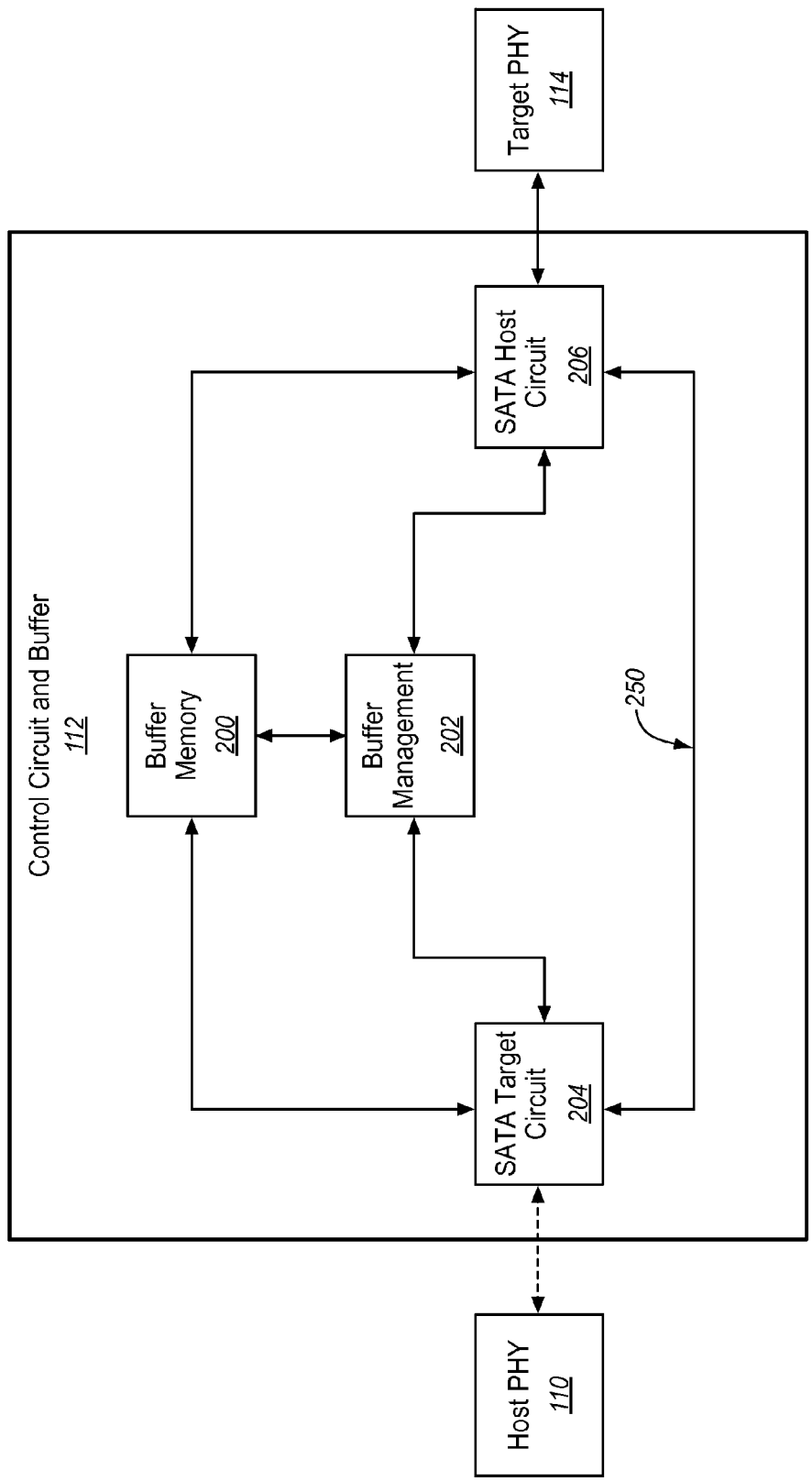
FIG. 2 is a block diagram providing exemplary additional details of the control circuits of the enhanced expander of FIG. 1.

FIG. 2 is a block diagram providing additional details of an exemplary embodiment of control circuit and buffer 112 of FIG. 1. Control circuit and buffer 112 may comprise buffer memory 200 used for storing commands and associated data exchanged between an STP initiator coupled through host PHY 110 and a SATA end device coupled through target PHY 114. Memory 200 may comprise any suitable memory device including, for example, random access memory ("RAM"). Buffer management 202 is any suitable circuit within control circuit and buffer 112 that serves to manage use of buffer memory 200. Commands and data stored in buffer memory 200 may be associated with meta-data to associate each stored piece of information with a corresponding initiator device, and/or with a corresponding target/end device, and/or with a corresponding PHY. Buffer management 202 therefore provides logic implementing services for allocating and freeing portions of buffer memory 200 and for managing associations of the allocated portions with particular devices in an established connection.

Where, as noted above, the expander establishes a connection between an STP initiator using a first speed (i.e., through host PHY 110) and a SATA target device using a second, slower speed (i.e., through target PHY 114), buffer memory 200 may also serve the function of a speed matching buffer.

Use of buffer memory 200 also allows for local management logic of the expander to assure that stored and forwarded information from SATA end device 122 to STP initiator device 120 will be presented in the correct sequence. If so enabled, SATA end device 122 may use Non-Zero Offset values (i.e., in a plurality of DMA Setup FISs) to return data to the initiator in any order the end device deems optimal. Buffer memory 200 stores commands and data exchanged between the two connected devices to allow the enhanced expander to forward the commands and data to the initiator device in proper sequence by operation of control circuit and buffer 112 (i.e., without intervention by the programmable controller). Thus, frames received from the SATA end device and stored in the buffer of the enhanced expander will be synchronized (i.e., properly sequenced) with related SATA protocol frames associated with the transfer. To provide such functions, control circuit and buffer 112 further comprises SATA target circuit 204 and SATA host circuit 206. In some exemplary embodiments, circuits 204 and 206 may include logic to selectively enable or disable their own operation to store and forward information through buffer memory 200. Communication path 250 represents a communication path in which circuits 204 and 206 are essentially bypassed to permit communications to pass more directly between target PHY 114 and host PHY 110. When features and aspects hereof are enabled, circuits 204 and 206 are configured to store and forward communications between PHY 110 and PHY 114 through buffer memory 200 and are adapted to assure proper sequencing of frames from the end device to the initiator in such communications.

In performing these functions, SATA target circuit 204 provides SATA target protocol processing for communications between the control circuit and an STP initiator coupled through host PHY 110 while SATA host circuit 206 provides SATA initiator protocol processing for communications between the control circuit and a SATA end device coupled through target PHY 114. SATA host circuit 206 communicates with the SATA end device 122 through PHY 114 and SATA target circuit 204 communicates with an STP initiator device through PHY 110. Circuits 204 and 206 then communicate as required to coordinate the storing and forwarding of data through buffer memory 200 (with assistance of buffer management 202) and the forwarding of related protocol frames regardless of the ordering of data returned from the end device (i.e., by use of Non-Zero Offset field values in DMA Setup FISs from the end device). In the presence of such out of order data being stored and forwarded, SATA host circuit 206 and SATA target circuit 204 assure that all data has been received from the end device, stored in buffer memory 200, and forwarded to the STP initiator device before any frames relating to completion status are forwarded to the initiator.

Those of ordinary skill in the art will readily recognize numerous additional and equivalent elements that may be present in a fully functional SAS expander and, in particular, in the control circuit and buffer memory logic components providing the enhanced features hereof in FIGS. 1 and 2. Such additional and equivalent elements are omitted herein for simplicity and brevity of this discussion.

Figure 3:
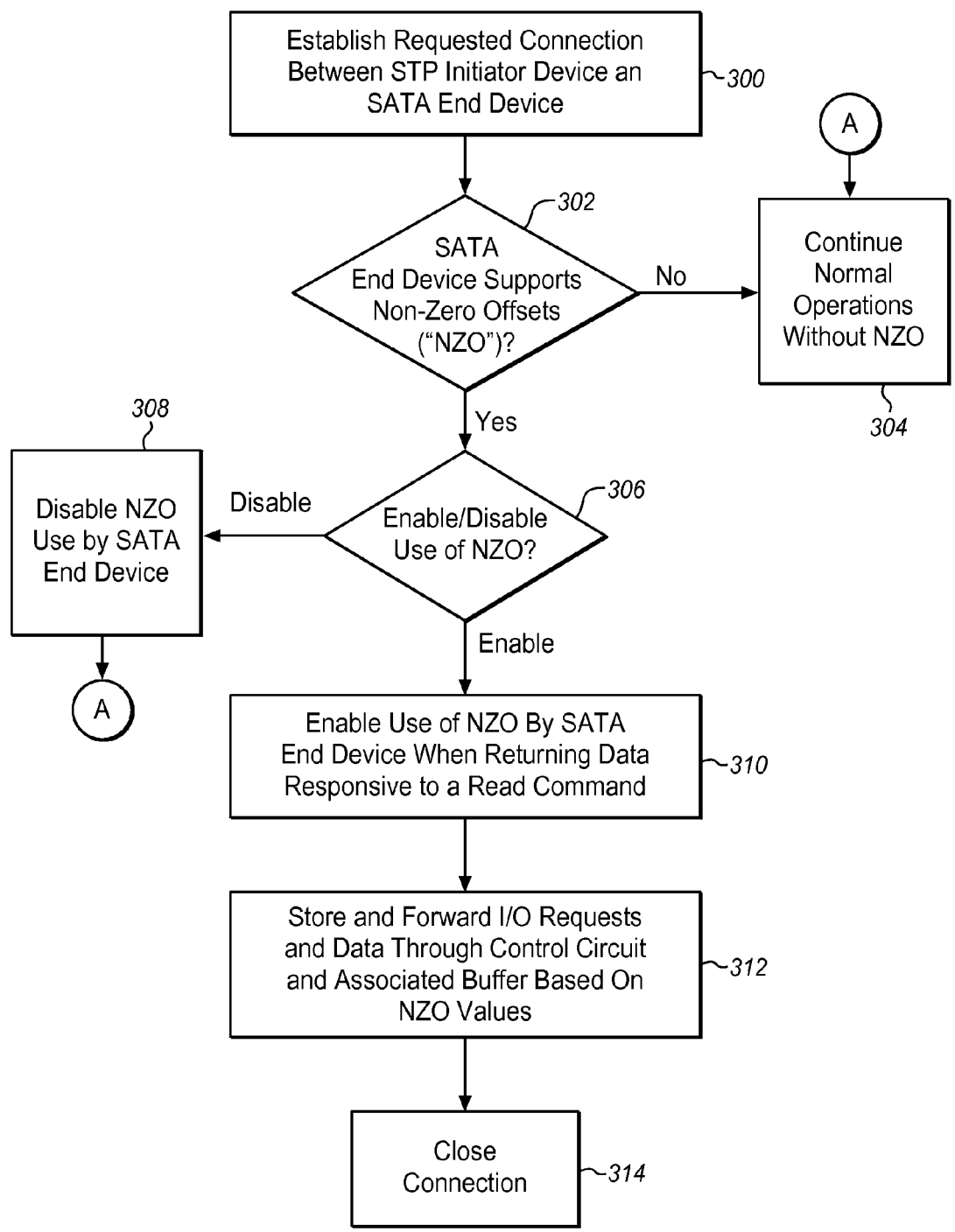
FIGS. 3 through 5 are flowcharts describing exemplary methods for operating a SAS expander enhanced in accordance with features and aspects hereof to provide buffering of commands and data and for managing use of Non-Zero Offset field values in the return of data from a SATA end device to an STP initiator device.

FIG. 3 is a flowchart describing an exemplary method for managing use of Non-Zero Offsets in transfers through an enhanced SAS expander in accordance with features and aspects hereof. The method of FIG. 3 may be performed in an enhanced SAS expander such as that described above in FIGS. 1 and 2 and more specifically may be performed within the programmable controller and the control logic of circuit 112 of FIGS. 1 and 2.

At step 300, the programmable controller of the enhanced SAS expander establishes a requested connection between an STP initiator device and an identified SATA end device. The processing of step 300 is substantially in accordance with standard SAS protocols to open a connection between two devices. Specifically, the STP initiator device transmits and Open Address Frame (OAF) through the SAS delivery subsystem (e.g., the SAS switched fabric) including the enhanced SAS expander directly coupled with the identified SATA end device. The enhanced SAS expander configures its switching circuits (by operation of its programmable controller) to establish a connection between the requesting STP initiator and SATA end device. In accordance with the structure of the enhanced SAS expander, the connection is established through the switching circuits and the control logic in conjunction with the buffer memory circuits used for enhancing performance of such a connection. At step 302, having established the requested connection, the programmable controller of the enhanced SAS expander determines whether the identified SATA end device supports Non-Zero Offset ("NZO") features in the DMA transfers returning requested data in response to read requests. If not, step 304 continues normal operation of a standard SAS expander to directly couple the STP initiator device with the identified SATA end device without further concerns regarding the use of NZO features. If the identified SATA end device supports NZO features, step 306 next determines whether the use of such NZO features will be enabled or disabled. In one exemplary embodiment, management of NZO features may simply entail disabling use of NZO features by the SATA end device returning requested read data. In such a case, step 308 next assures that the NZO features available in the identified SATA end device are presently disabled. An appropriate SATA configuration command, well known to those of ordinary skill in the art, may be transferred to the SATA end device to assure disabling of the NZO features. Processing then continues at step 304 (label "A") to continue normal operation of the SAS expander with the supported NZO features of the SATA end device presently disabled.

If the NZO features are supported by the identified SATA end device and are to be enabled, step 310 transmits an appropriate SATA standard configuration command to the identified SATA end device to enable use of the NZO features by the SATA end device when returning data responsive to processing of a received read command. Step 312 then represents ongoing operations to receive commands and data from the STP initiator device as well as data and status from the SATA end device by applying store and forward features of the control circuit of the enhanced SAS expander through the associated buffer memory. Commands and data received from the STP initiator device may be stored temporarily in the buffer associated with the control circuit to be forwarded to the identified SATA end device in due course (e.g., utilizing the buffer memory as a speed matching buffer). With regard to features and aspects hereof, processing of step 312 also encompasses receipt of data and status information from the SATA end device responsive to a read command and storing and forwarding such received data and status through the control circuit and associated buffer back to the requesting STP initiator device.

In particular, step 312 comprises receiving DMA setup FISs in which the offset field values may be programmed to any value as desired by the SATA end device. In other words, with the NZO features enabled in the SATA end device, the end device is capable of returning requested read data in any order it desires—e.g., as contiguous data starting at the requested logical block address or in portions in any order where the offset field of each of multiple associated DMA setup FISs specifies where associated data is to be positioned in relation to the requested data. Further details of processing of step 312 are provided herein below with respect to FIG. 4.

The processing of step 312 may continue in an iterative manner until such time as the STP initiator device has no further commands to be issued to the SATA end device and requests that the connection be closed or until such time as a timeout of inactivity is encountered within the SAS expander forcing a closure of the established connection. Upon receipt of an explicit request to close the connection or upon detection of a timeout with no activity from the STP initiator device, step 314 closes the established connection. The process of FIG. 3 may then be repeated as required when a new connection is requested to be established.

Figure 4:
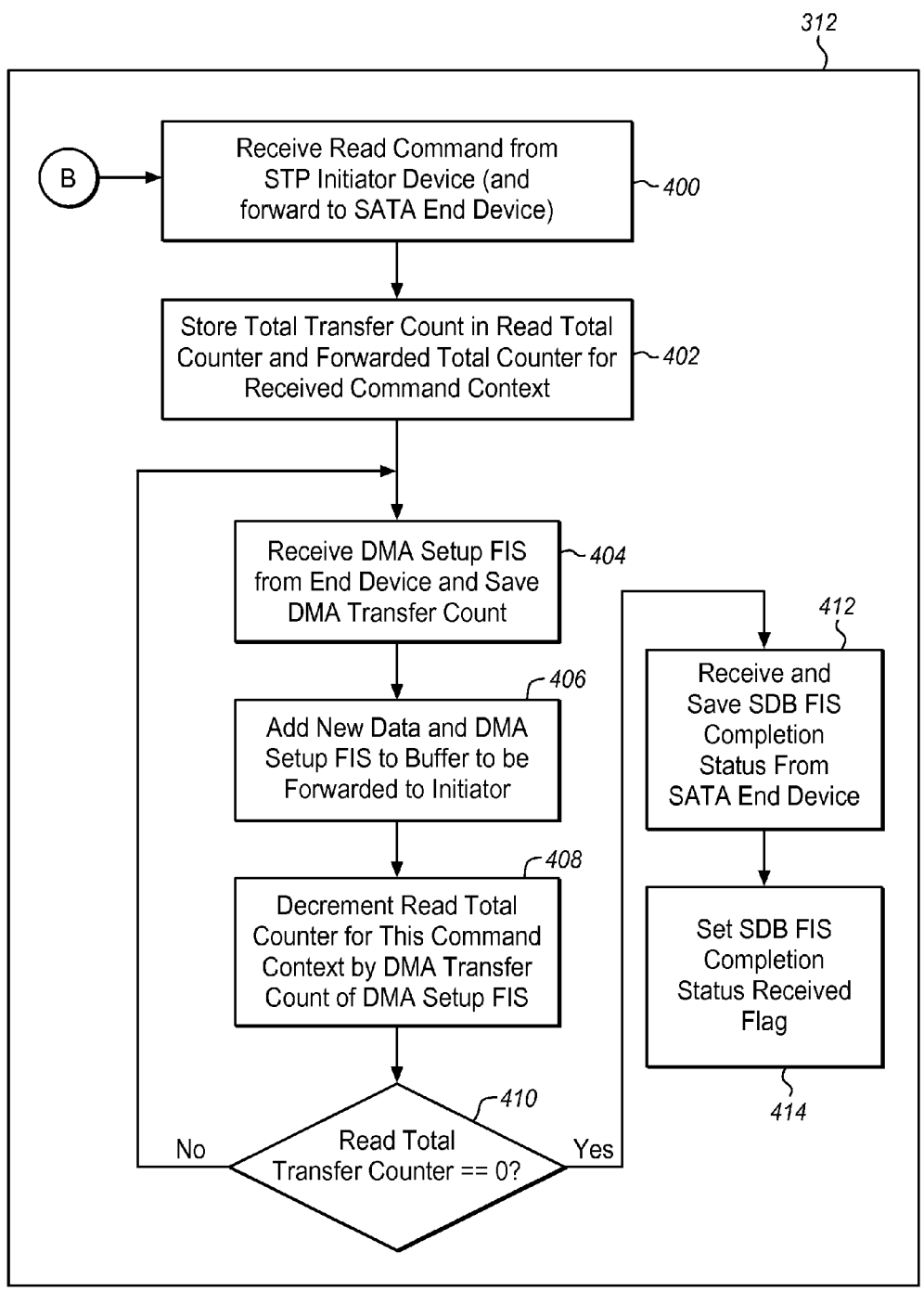

FIG. 4 is a flowchart describing exemplary additional details of the processing of step 312 to store and forward commands and data exchanged between the STP initiator device and the identified SATA end device in the established connection. The flowchart of FIG. 4 emphasizes processing of read commands and the return of requested read data from this SATA end device responsive to receipt of such a read command. Those of ordinary skill in the art will readily recognize related processing for write commands wherein the STP initiator device transfers a write command and associated data through the control logic and associated buffer memory to be forwarded to the SATA end device. Features and aspects hereof are primarily focused on the processing of a read command and more specifically on the processing associated with return of data from the SATA end device to a requesting STP initiator device utilizing the NZO features of the SATA end device and the buffering features of the enhanced SAS expander.

Step 400 represents receipt of a read command from the STP initiator device and the forwarding of the received read command to the identified SATA end device in the established connection. As noted above, control logic and buffer memory of the enhanced SAS expander is utilized in storing and forwarding such a received read command to the identified SATA end device. The buffer memory in such a case acts in the role of a speed matching buffer. Each such command transferred to a SATA end device from an STP initiator may be associated with a context structure in the enhanced expander. The context structure stores information regarding the original command and status of progress of the command as related data may be transferred between the initiator and the end device.

At step 402, the total transfer count indicated by the received read command is stored in a read total counter and a forwarded total transfer counter. The total transfer count value may be specified in any units (typically a number of blocks or sectors) and converted as required into a total number of bytes or other units of data to be transferred from the identified SATA end device to the enhanced expander to then be stored and forwarded to the initiator device. Further, the total transfer total counter may be stored in the context data structure associated with the received read command or in any other suitable counter component such as a counter circuit or a register. In some embodiments, a first copy of the total count value may be stored in a read total transfer counter used by the SATA host circuit of the enhanced expander to monitor the number of bytes (or other units) of data received from the end device. A second copy of the total transfer count value may be stored in a forwarded total transfer counter used by the SATA target circuit of the enhanced expander to monitor the amount of data already forwarded to the requesting initiator device. Since the enhanced SAS expander allows for multiple connections to be established between one or more STP initiator devices and the identified SATA end device, each such connection and each such command received from any connection may be associated with a corresponding context structure and or counters. The context structure may include tag information, initiator identification information, and other identifying information to associate the corresponding command with a corresponding command from a corresponding STP initiator device. Thus, the method of FIG. 4 (and indeed the entire method of FIG. 3) may be operable substantially in parallel within the enhanced SAS expander for each of multiple established connections between any of multiple STP initiator devices one or more SATA end devices.

Step 404 through 410 are then iteratively operable to receive portions of the requested read data from the identified SATA end device of a particular established connection. In particular, step 404 represents receipt within the control logic of the enhanced SAS expander of a DMA setup FIS from the SATA end device. Each DMA setup FIS includes a transfer count of the number of bytes or other units of data to be transferred from the SATA end device to the enhanced SAS expander (through its control logic and buffer memory). The transfer count received in the DMA setup FIS may be saved for future utilization in determining whether the total transfer count value in the read total transfer counter has been satisfied. At step 406, control logic of the enhanced SAS expander stores (e.g., queues) the received DMA Setup FIS in the buffer memory and activates its DMA capabilities to receive the data and to store (e.g., queue) the received data associated with the DMA setup FIS in the buffer. The queued information is then used by other processing of the control logic (as discussed below) to forward the received data to the requesting initiator device.

As noted above, with the NZO features of the SATA end device enabled, the SATA end device has the flexibility to send data (with one or more associated DMA setup FISs) in any order it desires for its optimal performance. The order may be a single DMA transfer commencing at the beginning LBA (offset 0) and ending at a final address representing a single contiguous transfer into the buffer memory. Alternatively, as determined by the SATA end device, optimal transfer of the data may be performed by transferring multiple DMA setup FISs each with an appropriate Offset value specified (all but one offset values being non-zero) such that the data is transferred in any desired order from these SATA end device. Such a determination may be made by the SATA end device in accordance with optimization techniques within the SATA end device well known to those of ordinary skill in the art.

Upon completing the DMA transfer of the amount of data specified in the DMA setup FIS transfer count, step 408 decrements of the read total transfer counter (e.g., stored within the command context) by the DMA transfer count of the received DMA setup FIS. Step 410 then determines whether the read total transfer counter, as decremented by step 408, now indicates that the read total transfer counter has been decremented to zero. In other words, step 410 determines whether all data requested by the read command has been successfully received from the SATA end device and stored in the buffer memory associated with the control logic of the enhanced SAS expander. If not, processing continues looping back to step 404 to await receipt of a next DMA setup FIS (with its corresponding offset field value) from the SATA end device. Thus, processing of steps 404 through 410 continues until all data requested by the read command has been received from the SATA end device and stored in the buffer memory of the enhanced SAS expander.

When the SATA end device has completed its transfer of all requested read data in whatever order it prefers, it transmits an SDB FIS indicating completion status of the requested transfer. At step 412, the control logic of the enhanced SAS expander receives the SDB FIS completion status and step 414 sets a flag (e.g., a semaphore) indicating its reception. Such a flag may be used as discussed below by the forwarding function of the control logic of the enhanced expander to note that the completion status has been received and may be forwarded to the STP initiator at the appropriate time.

Figure 5:
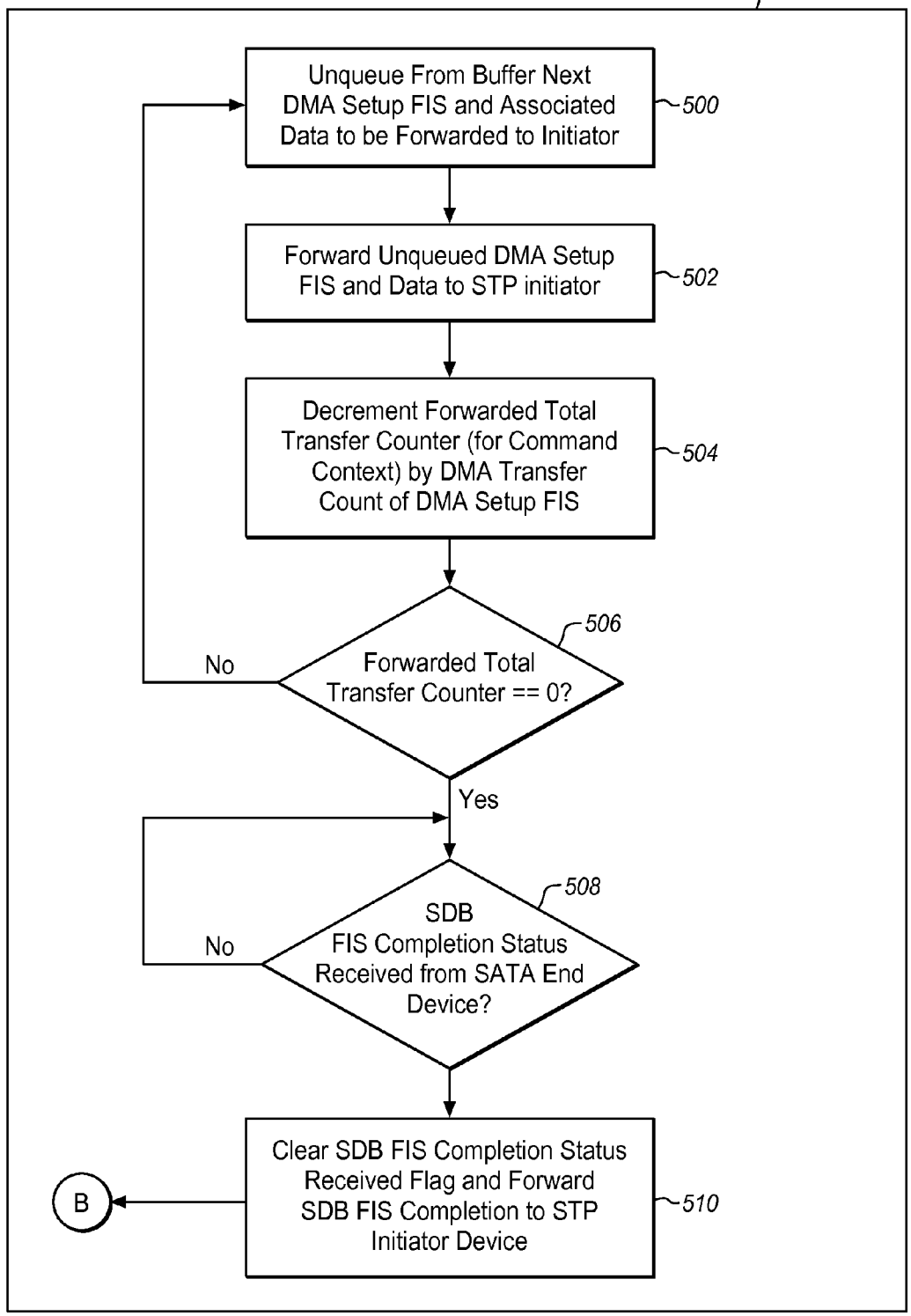

As noted above, as DMA Setup FISs and corresponding data frames are received from the end device, they are stored (queued) in the buffer memory. A parallel process (e.g., a parallel thread of operation of the control logic of the expander) awaits such queued frames and forwards those frames to the STP initiator. FIG. 5 shows further exemplary details of the processing of step 312 of FIG. 3 to forward received frames to the STP initiator from the buffer memory. Step 500 awaits a next entry queued in the buffer memory. When a next entry is found in the queue, step 500 unqueues that entry. As discussed above, DMA Setup FISs and associated data FISs may be stored in the buffer (queued therein) for later forwarding to the STP initiator. In general, the forwarding process may remain substantially synchronized with reception and storage of the FISs from the SATA end device. However, some inherent latency is likely and thus the process of forwarding may operate as a separate process/thread within the enhanced expander. The queued entry may comprise one or more actual FISs to be transmitted or may comprise pointer or other metadata identifying one or more FISs to be forwarded to the STP initiator. The data FISs as received from the SATA end device may be stored in the buffer. The corresponding DMA Setup FISs received from the SATA end device may also be stored in the buffer for forwarding to the initiator or may be re-created as required by control logic of the enhanced expander. Step 502 then forwards (transmits) the one or more FISs identified by the unqueued entry to the STP initiator.

At step 504, the forwarded total transfer counter for the command is decremented by the DMA transfer count of the associated DMA setup FIS for the forwarded data. As noted, the forwarded total transfer counter may be stored in a context structure associated with the corresponding command or in any suitable memory/counter structure or component. Further, those of ordinary skill in the art will recognize numerous equivalent steps or structures for maintaining a total transfer count for the data as it is received from the SATA end device and for the data as it is forwarded from the queue/buffer to the STP initiator device. Two separate counters, both stored in the context structure of a command is therefore intended merely as one exemplary structure. Step 506 then determines whether all data stored in the buffer (received from the SATA end device) has been forwarded to the STP initiator device. If not, processing continues looping back to step 500 to await another queued entry.

When all requested data has been so forwarded to the initiator, step 508 awaits a status indication that the SDB FIS completion status has been received within the control logic of the enhanced SAS expander from the SATA end device. As noted above at step 414, a flag/semaphore is set by the control logic when the SDB FIS is received from the end device. In accordance with standard SATA protocol, an SDB FIS is transmitted from the SATA end device to the STP initiator to indicate completion of return of the requested read data. However, in view of the store and forward buffering within the enhanced SAS expander and in view of other latency and timing issues, the SDB FIS may be received within the control logic of the enhanced SAS expander prior to completion of forwarding of stored data to the STP initiator device. When a flag is set by the control logic indicating that the SDB FIS completion status has been received from the SATA end device, step 510 clears the flag/semaphore and forwards the received SDB FIS completion status to the STP initiator device. Processing then continues at step 400 (label "A" of FIG. 4) to await receipt of a next read command from the STP initiator device (or closure of the established connection).

Those of ordinary skill in the art will readily recognize numerous equivalent and additional steps that may be present in fully functional methods such as the methods of FIGS. 3 through 5. Such additional and equivalent steps are omitted herein for simplicity and brevity of this discussion.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A Serial Attached SCSI (SAS) expander comprising:
    a host physical link (PHY) adapted to couple with a Serial Advanced Technology Attachment (SATA) Tunneling Protocol (STP) initiator device;
    a target PHY adapted to couple with a SATA end device;
    a programmable controller adapted to establish a connection between the host PHY and the target PHY to permit the transfer of data from the STP initiator device to the SATA end device, and further adapted to enable use of Non-Zero Offset fields when the SATA end device supports use of Non-Zero Offset fields; and
    a control circuit adapted to store and forward data exchanged between the STP initiator device and the SATA end device over the established connection.

2. The expander of claim 1
    wherein the control circuit is further operable to receive a Set Device Bits (SDB) Frame Information Structure (FIS) from the SATA end device, and to delay forwarding of the SDB FIS, until all data received from the SATA end device responsive to a command from the STP initiator device has been forwarded to the STP initiator device.

3. The expander of claim 1
    wherein the programmable controller is further adapted to detect whether the SATA end device supports Non-Zero Offset fields based on information in an Identify FIS received from the SATA end device.

4. The expander of claim 1
    wherein the programmable controller is further adapted to disable use of Non-Zero Offset fields in exchanges through the established connection to preclude the SATA end device from transmitting data in any order other than a sequential order.

5. The expander of claim 1
    wherein the programmable controller is further adapted to enable use of Non-Zero Offset fields by the SATA end device to permit the SATA end device to transmit data to the control circuit in any order.

6. The expander of claim 1
    wherein the control circuit comprises an I/O request transfer counter,
    wherein the control circuit is further adapted to load the transfer counter with a total transfer length in response to receipt of a command from the STP initiator device,
    wherein the control circuit decrements the transfer counter by the amount of data received in each data FIS received from the SATA end device responsive to the command, and
    wherein the control circuit is further adapted to detect that all data has been received from the SATA end device by detecting that the transfer counter has decremented to zero.

7. The expander of claim 1, wherein:
    each Non-Zero Offset field specifies a relative position of a portion of the data associated with that Non-Zero Offset field.

8. The expander of claim 1, wherein:
    each Non-Zero Offset field is associated with a single Frame Information Structure (FIS).

9. The expander of claim 1, wherein:
    the expander is further operable to receive a total transfer counter indicating a total number of bytes to be to be transferred from the SATA end device to the SAS expander.

10. The expander of claim 1, wherein:
    the control circuit is further operable to assure that all data for the established connection has been received from the SATA end device before forwarding data relating to completion status to the STP initiator device.

11. The expander of claim 1, wherein:
the control circuit is further operable to assure proper sequencing of data forwarded to the STP initiator device, based on the Non-Zero Offsets.

12. A method operable in a Serial Attached SCSI (SAS) expander, the method for managing use of Non-Zero Offset fields in exchanges between devices coupled with the expander, the method comprising:
establishing, by operation of a programmable controller of the expander, a connection between a Serial Advanced Technology Attachment (SATA) Tunneling Protocol (STP) initiator device coupled through a host physical link (PHY) of the expander and a SATA target device coupled through a target PHY of the expander, wherein the established connection uses a control circuit of the expander to store and forward data;
enabling, by operation of the programmable controller, use of Non-Zero Offset fields by the SATA end device when the SATA end device supports use of Non-Zero Offset fields;
storing, by operation of the control circuit, data Frame Information Structures (FISs) transmitted over the connection; and
forwarding, by operation of the control circuit, the stored data FISs to the STP initiator device.

13. The method of claim 12, further comprising:
receiving, by operation of the control circuit, a Set Device Bits (SDB) FIS from the SATA end device indicative of the end of data transmission from the SATA end device in response to a command from the STP initiator device; and
delaying, by operation of the control circuit, forwarding of the received SDB FIS to the STP initiator device until all data received from the SATA end device in response to the command has been transmitted from the buffer to the STP initiator device.

14. The method of claim 12 further comprising:
identifying whether the SATA end device supports Non-Zero Offsets based on information in an Identify FIS received from the SATA end device.

15. The method of claim 12, wherein:
each Non-Zero Offset field specifies a relative position of a data FIS associated with that Non-Zero Offset field.

16. The method of claim 12, wherein:
each Non-Zero Offset field is associated with a single FIS.

17. The method of claim 12, further comprising:
receiving a total transfer counter indicating a total number of bytes to be to be transferred from the SATA target device to the SAS expander.

18. The method of claim 12, further comprising:
assuring that all data for the established connection has been received from the SATA target device before forwarding data relating to completion status to the STP initiator device.

19. The method of claim 12, further comprising:
assuring proper sequencing of data forwarded to the STP initiator device, based on the Non-Zero Offsets.

20. A method operable in a Serial Attached SCSI (SAS) expander, the expander adapted to couple with a Serial Advanced Technology Attachment (SATA) Tunneling Protocol (STP) initiator device and further adapted to directly couple with a SATA end device, the method for managing use of Non-Zero Offset fields in exchanges between the SATA end device and the STP initiator device, the method comprising:
establishing, by operation of a programmable controller of the expander, a connection through the expander between the STP initiator device and the SATA end device;
disabling, by operation of the programmable controller, use of Non-Zero Offset field values in data transferred from the SATA end device;
receiving, by operation of a control circuit of the expander, a read command from the STP initiator device;
receiving, by operation of the control circuit, data from the SATA end device responsive to the read command;
storing, by operation of the control circuit, the data within the expander; and
forwarding, by operation of the control circuit, the data to the STP initiator device in an order in which it was received from the SATA end device.

* * * * *